July 15, 1969  F. J. OWENS ET AL  3,455,030
DIRECTIONAL GYROSCOPE
Filed July 11, 1966  3 Sheets-Sheet 1

INVENTORS.
FRED J. OWENS
HENRY KONET

BY *Browne, Schuyler & Beveridge*

ATTORNEYS

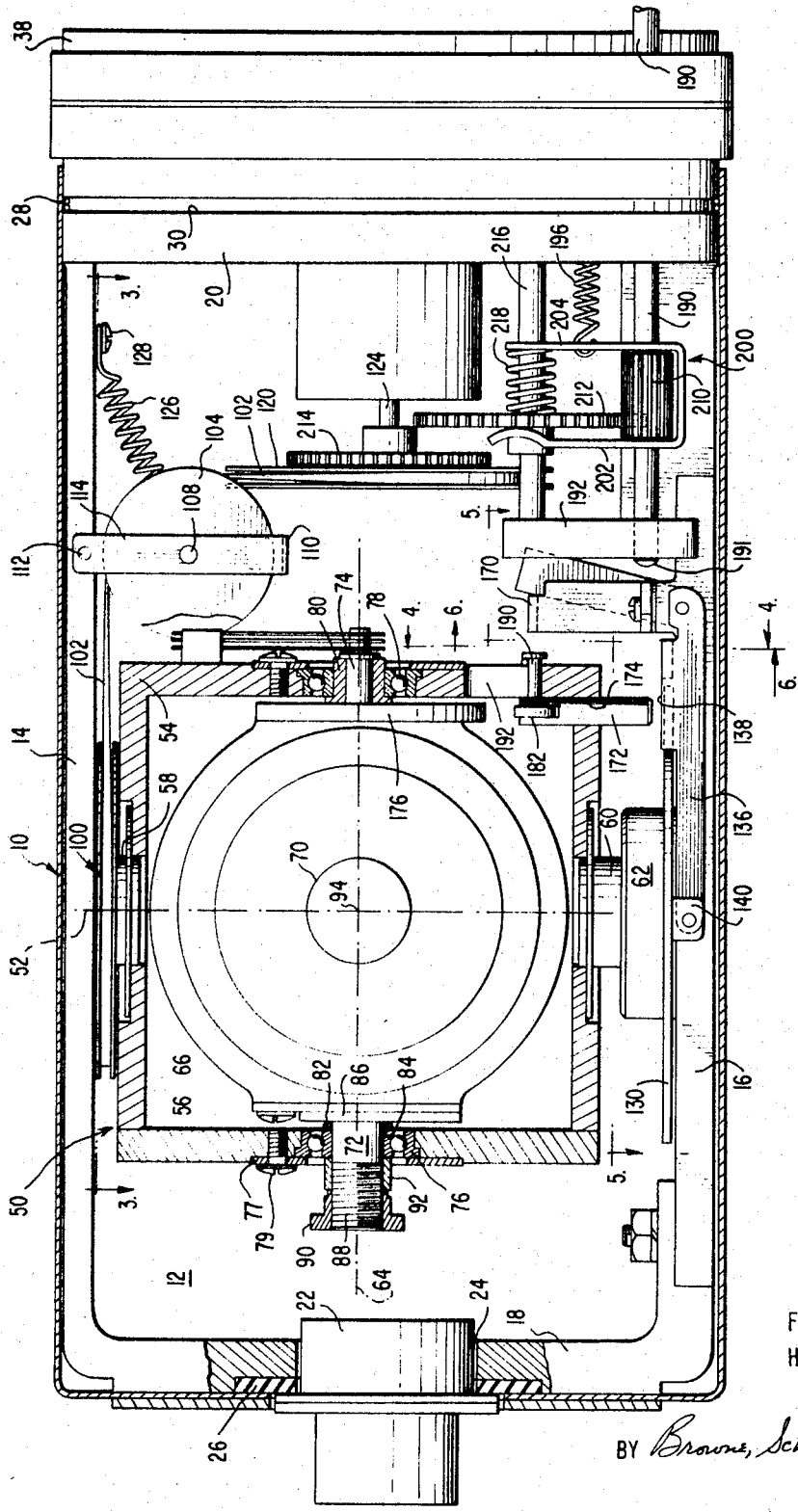

July 15, 1969  F. J. OWENS ET AL  3,455,030
DIRECTIONAL GYROSCOPE
Filed July 11, 1966  3 Sheets-Sheet 3

INVENTORS.
FRED J. OWENS
HENRY KONET
BY Browne, Schuyler and Beveridge
ATTORNEYS – # United States Patent Office 3,455,030
Patented July 15, 1969

3,455,030
DIRECTIONAL GYROSCOPE
Fred J. Owens, Pompton Plains, and Henry Konet, Ho-Ho-Kus, N.J., assignors to Aircraft Radio Corporation, Boonton, N.J., a corporation of New Jersey
Filed July 11, 1966, Ser. No. 564,223
Int. Cl. G01c 19/34
U.S. Cl. 33—204                                                13 Claims

ABSTRACT OF THE DISCLOSURE

A directional gyroscope wherein the outer gimbal is operatively connected to the direction indicator by means of a pulley system.

---

This invention relates to directional gyroscopes and has for one of its objects the provision of a directional gyroscope which is accurate and reliable while having an improved construction that is durable, economically manufactured and easily serviced.

A further object of the present invention is to provide a directional gyroscope having a novel mechanism for transmitting to an indicating dial, movement of the outer gimbal in response to directional changes. Included herein is the provision of such a transmission mechanism which operates sensitively with low friction and facilitates adjustment of the indicating dial.

A still further object of the present invention is the provision of such a directional gyroscope having an improved caging mechanism and also an adjustment feature by which end play of the inner gimbal may be selectively adjusted and controlled.

Other objects and advantages will be apparent from the following detailed description taken in conjunction with the accompanying drawings in which:

FIG. 2 is an enlarged side view of the gyroscope of FIG. 1 as seen generally along lines 2—2 of FIG. 1 with certain parts removed and others shown in cross-section;

Figure 1:
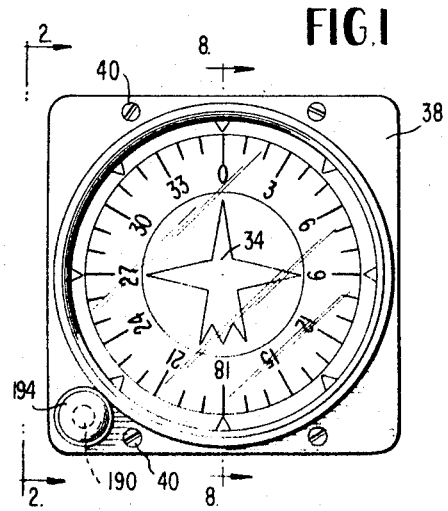
FIG. 1 is a front elevational view of a directional gyroscope embodying the present invention.

For purposes of illustration, reference is now made to the drawings where there is shown an electrically driven directional gyroscope embodying the present invention, including a rectangular housing 10 defining an elongated chamber 12 in which is fixed a generally rectangular frame including upper and lower portions 14 and 16 extending along opposite sides of the housing and terminating in opposite end walls 18 and 20. Electrical connections to the gyroscope are provided through a coupling 22 extending through outlet 24 in rear frame wall 18 with the outlet being sealed by a resilient gasket 26. At its front end, the gyroscope is sealed by O-rings 28 received in an annular recess 30 in the frame front wall 20 for engagement around the inner peripheral surface of the housing.

Figure 8:
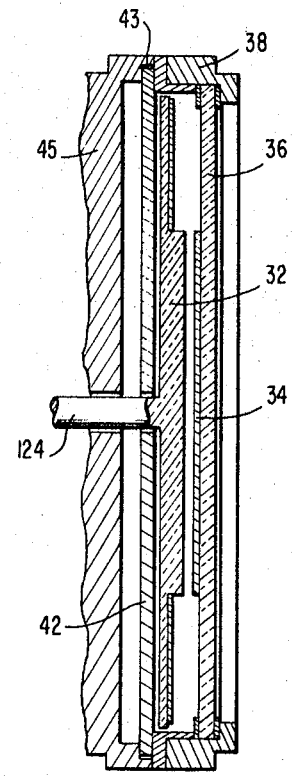
FIG. 8 is an enlarged cross-sectional view taken generally along lines 8—8 of FIG. 1.

Referring to FIGS. 1 and 8 azimuth indication is provided by an azimuth dial 32 and associated pointer 34, the former being rotatable in response to directional changes as will be subsequently explained in greater detail. Azimuth dial 32 is covered by a glass panel 36 suitably mounted in an internal recess of a face plate 38 fixed to the frame front wall 20 by screws 40. Pointer 34 is fixed to the central portion of glass panel 36 so that in indicating direction, dial 32 moves relative to pointer 34. Dial 32 and pointer 34 are illuminated by means of a luminescent panel 42 mounted behind the dial in an annular recess 43 of a backing plate 45. To emit luminescent light from panel 42, the indicia of the dial and pointer are made translucent and the remaining portions opaque.

Referring now to FIG. 2, a vertical gimbal generally designated 50 is mounted in the frame for rotation about a vertical axis 52. In the shown embodiment, vertical gimbal 50 has a generally rectangular shape formed by a generally U-shaped member 54 and an end plate 56 fixed thereto by screws (not shown). Upper and lower vertical trunnions 58 and 60, suitably fixed to gimbal 50, are mounted in bearings 62 received in aligned passages formed in upper and lower frames 14 and 16.

Jourannel in outer gimbal 50 for rotation about horizontal axis 64 is an inner gimbal which in the shown embodiment is constituted by the case or housing 66 of the motor which drives the gyroscope rotor, the latter being indicated by numeral 70 in FIG. 2. Mounting of motor case 66 is effected by diametrically opposed trunnions 72 and 74 suitably fixed to the motor case to extend through aligned passages formed in the sidewalls of vertical gimbal 50. Ball bearing assemblies generally designated 76 and 78 are provided in the outer gimbal bearing passages and a flanged bushing 80 is provided about forward trunnion 74 with its flange located between the motor case and the front side wall of the outer gimbal. Retention of ball bearing assemblies 76 and 78 in outer gimbal 50 is achieved by retaining rings 77 fixed to the outer gimbal by screws 79.

To adjust and control the end play of motor case 66 in its bearings, a resilient deformable O-ring 82 is positioned about rear trunnion 72 to oppositely engage the inner race 84 of ball bearing 76 and an adjacent end plate 86 fixed to the motor case. Trunnion 72 is formed with external threads 88, and an adjusting nut 90 is engaged on threads 88 to act on a spacer sleeve 92 which in turn abuts the inner ball bearing race 84. Thus merely by advancing or withdrawing nut 90 along trunnion threads 88, end play of the motor case may be adjusted as desired.

Gyroscope rotor 70 is suitably mounted in motor case 50 for rotation about horizontal spinning axis 94 which is at right angles to axis 64 of motor case trunnions 72 and 74. Electraical connections from coupling 22 are carried to the motor in any suitable manner and are not shown in the drawings for purposes of clarity. Likewise, although not shown, electrical connections to luminescent panel 42 may be effected in any suitable manner such as by carrying them along lower frame 16. For purposes of erection, motor case 50 is provided with an outlet nozzle (not shown) that is supplied with self-generated air jets according to known practice.

Figure 3:
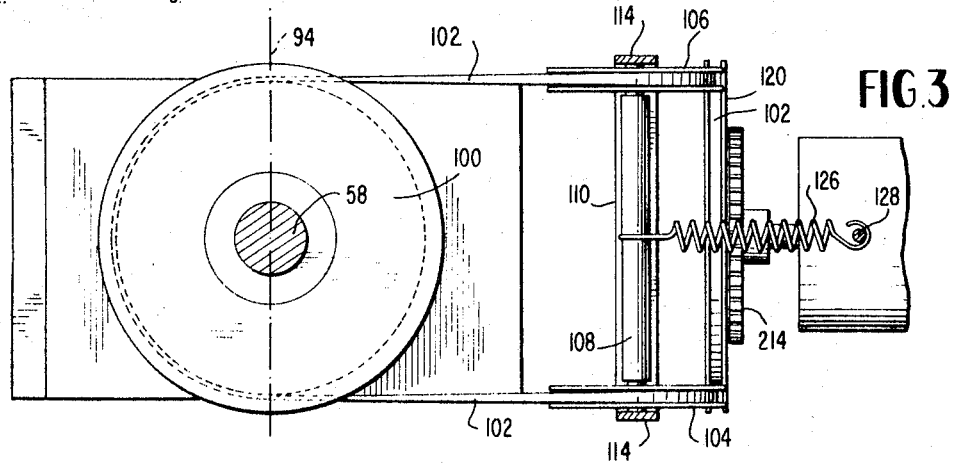
FIG. 3 is a fragmental cross-sectional view taken generally along lines 3—3 of FIG. 2.

In accordance with well-known gyroscopic principles, assuming the gyroscope is mounted in aircraft such that the longitudinal axis of the gyroscope housing extends in the direction of travel, directional changes of the aircraft will cause vertical gimbal 50 to rotate about axis 52. Translation of this movement from vertical gimbal 50 to indicator dial 32 is provided in a novel manner by a transmission system of pulleys. In the shown embodiment this system includes what will be termed a "pick-off" pulley 100 fixed about upper vertical trunnion 58 to be movable with the latter upon rotation of vertical gimbal 50. Received around pick-off pulley 100 is a belt 102 which passes about a pair of idler pulleys 104 and 106 mounted for rotation about a shaft 108 extending normal to the longitudinal axis of the gyroscope housing. In the illustrated embodiment, idler pulley shaft 108 is mounted in a U-shaped bracket 110 pivotally suspended from upper frame portion 14 by pins 112. Opposite arms 114 of bracket 110 have aligned apertures which receive reduced end portions 116 of idler pulley shaft 108 as shown in FIG. 3. Opposite portions of pulley belt 102 pass over idler pulleys 104 and 106 and then extend downwardly (as shown in FIG. 2) and around a drive pulley 120 fixed at right angles to a drive shaft 124 which extends in the direction of the longitudinal axis of the housing. Drive shaft 124 extends forwardly where it is fixed to indicator dial 32 to rotate the same in response to movement of vertical gimbal 50 as translated by the pulley system.

To maintain a predetermined amount of tension in pulley belt 102, a tension coil spring 126 is anchored at one end by screw 128 to upper frame 14 and engaged at the opposite end about idler pulley shaft 108 as shown in FIGS. 2 and 3.

Figure 5:
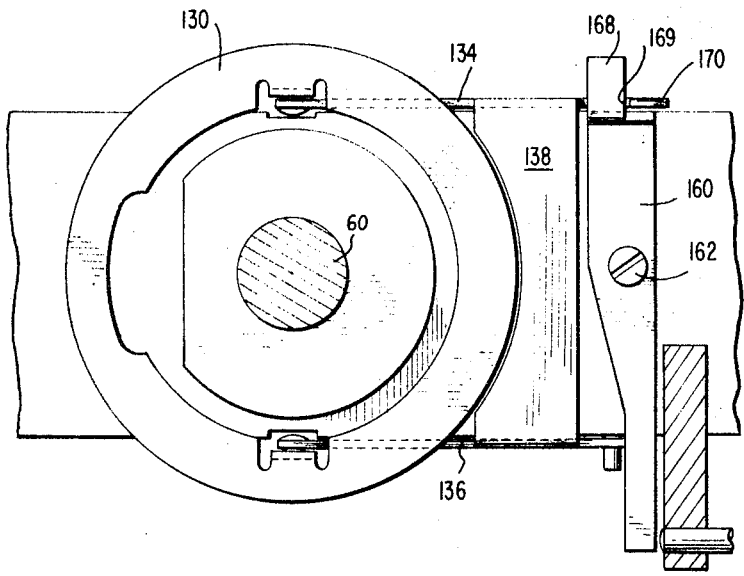
FIG. 5 is a fragmental cross-sectional view taken generally along lines 5—5 of FIG. 2.
Figure 7:
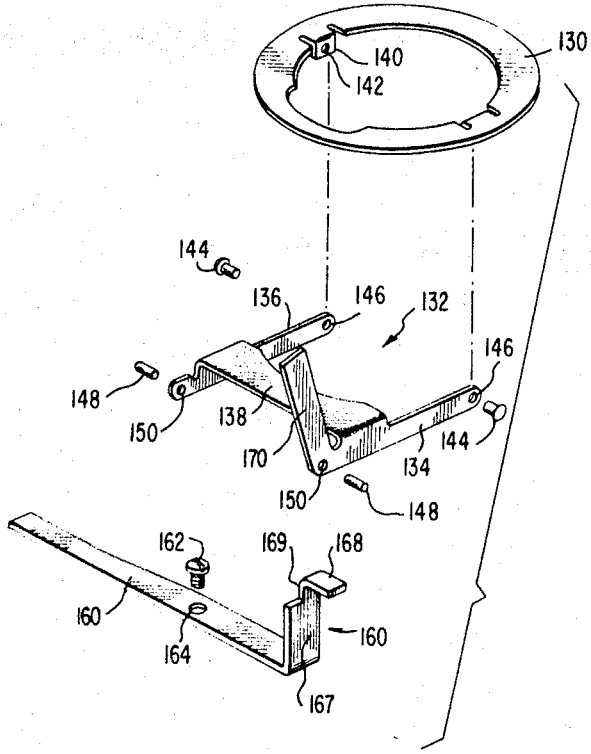
FIG. 7 is an exploded perspective view of a caging mechanism included in the gyroscope.

Referring to FIGS. 2, 5 and 7 caging in the gyroscope is effected by an annular bale 130 positioned about lower bearing 62 of vertical gimbal 50 to be movable into and out of engagement with the lower wall of vertical gimbal 50. In accordance with another aspect of the present invention actuation of bale 130 upwardly for caging is accomplished by mechanism including a bale lever 132 comprised of a pair of elongated legs 134 and 136 extending along opposite sides of lower frame 16 and interconnected by a flat crosspiece 138 extending transversely of the housing. The rearwardly disposed ends of bale lever legs 134 and 136 are pivotally connected to a pair of diametrically opposed tabs 140 downstruck from the inner periphery of bale 130. Tabs 140 are formed with apertures 142 which receive pivot pins 144 extending through apertures 146 in legs 134 and 136. The opposite or forwardly disposed ends of bale lever legs 134 and 136 are pivotally connected to lower frame 16 by pins 148 extending transversely of the housing and into frame 16 through apertures 150 in legs 134.

For pivoting bale lever 132 upwardly for caging, an actuating lever 160 is pivotally mounted across lower frame 16 by a screw 162 received through an aperture 164 in actuating lever 160 and into lower frame 16. Extending across the forward portion of bale lever 132, actuating lever 160 has at one end an upstanding, inverted, L-shaped projection 166 which is engageable with an upstanding crank portion 170 of bale lever 132 upon clockwise rotation of actuating lever 160 as viewed in FIGS. 5 and 7. In the particular embodiment shown, the actuating levers projection 166 has a vertical portion 167 and an outwardly projecting flange portion 168 which is recessed at 169 to receive and abut against crank portion 170 of bale lever 132. It will thus be seen that by pivoting actuating lever 160 about screw 164 as will be subsequently described in greater detail, bale lever 132 will pivot upwardly about pins 148 to raise bale 130 for caging engagement against the bottom of vertical gimbal 50.

Figure 4:
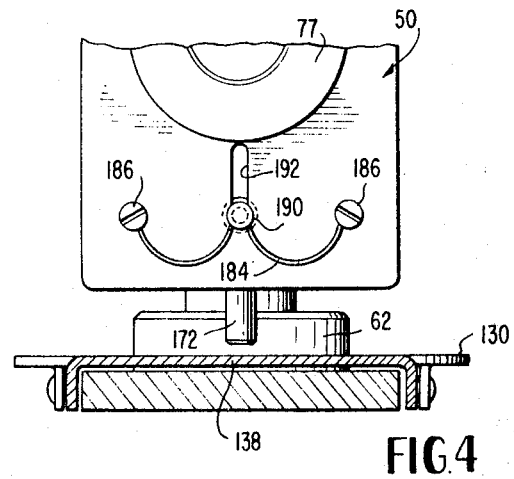
FIG. 4 is a fragmental cross-sectional view taken generally along lines 4—4 of FIG. 2.

Simultaneously with caging, the gyroscope is leveled by a pin and cam arrangement including a pin 172 slidably received in a passage 174 formed in the lower wall of vertical gimbal 50 parallel to vertical gimbal axis 52. Above leveling pin 172 there is fixed to the forward end of motor case 66 a partially heart-shaped cam 176 having arcuate cam surfaces 178 which meet to define a recess 180 into which leveling pin 172 is moved in leveling the motor case and rotor 70. To minimize friction in the illustrated embodiment, the upper end of leveling pin 172 is bifurcated to receive a roller 182 which is engageable with cam 176. Additionally a spring mechanism is provided for biasing leveling pin 172 downwardly away from cam 176; the shown spring mechanism including a generally W-shaped, wire-like spring 184 fixed at its opposite ends by screws 186 to the front wall of vertical gimbal 50 as shown in FIG. 4. The intermediate portion of spring 184 is engaged over a lug 190 projecting laterally from leveling pin 172 through an elongated slot 192 in the front wall of vertical gimbal 50. It will be apparent that when bale lever 132 is pivoted upwardly for caging, its crosspiece 138 will raise pin 172 into engagement with surfaces 178 of cam 176 to cause rotation of motor case 66 about its trunnion axis 64 into level position. When bale lever 132 is released for uncaging as will be described in greater detail, leveling pin 172 will be returned to its lower position by biasing spring 184.

Figure 6:
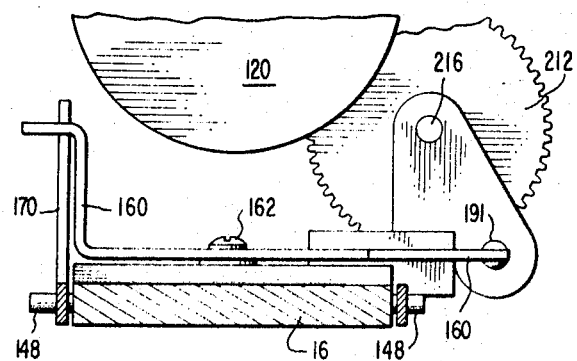
FIG. 6 is a fragmental cross-sectional view taken generally along lines 6—6 of FIG. 2.
Figure 9:
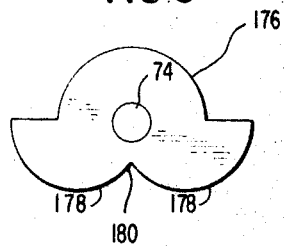
FIG. 9 is a detail view of a leveling cam included in the gyroscope.

Referring now to FIGS. 2 and 6, a plunger consisting of an elongated rod 190, is provided for rotating actuating lever 160 to pivot bale lever 132 for caging. Plunger 190 is mounted for reciprocable movement along its longitudinal axis by means of aligned passages through front plates 38 and 45 and a rigid support element 192 upstanding from lower frame 16. Support element 192 has a passage receiving plunger 190 with the inner end 191 of the plunger positioned adjacent the end portion of actuating lever 160. For manual operation, plunger 190 projects from the front face of the gyroscope and is provided with a thumb knob 194. Upon depression of plunger 190 its inner end 191 will engage and rotate actuating lever 160 for pivoting bale lever 132 for caging purposes.

For automatic retraction of plunger 190 from its inward caging position to a position spaced from actuating lever 160, a spring mechanism is provided including a tension coil spring 196 having one end suitably anchored to the front frame wall 20 and its opposite end hooked in an aperture of a U-shaped bracket 200 as shown in FIG. 2. Bracket 200 is fixed on plunger 190 through a pair of aligned mounting apertures in the opposite legs 202 and 204 of the bracket which receive plunger 190.

Plunger 190 and its bracket 200 are also employed in adjusting indicating dial 32 through gears which include a pinion 210 fixed about plunger 190 between bracket legs 202 and 204, and an intermediate motion-transmitting gear 212 which is cooperable with an adjustment gear 214 fixed about dial drive shaft 124. Intermediate gear 212 is slidably received on a rod 216 fixed between front frame 20 and support element 192 in parallel to plunger 190 as shown in FIG. 2. Front leg 204 of bracket 200 is apertured at its free end to receive slide rod 216 with intermediate gear 212 positioned between bracket legs 202 and 204. Rear bracket leg 202 is curved at its extremity to provide minimum surface contact with one side of intermediate gear 212, and a compression coil spring 218 is provided about slide rod 216 between bracket leg 204 and the opposite side of intermediate gear 212 to bias the intermediate gear against bracket leg 202. In use, when plunger 190 is moved inwardly for caging, bracket 200 will move along slide rod 216 to mesh intermediate gear 212 with adjusting gear 214. Indicator dial 32 may then be adjusted merely by rotating plunger 190 the motion of which will be transmitted from pinion 210 to adjusting gear 214 to rotate indicating dial 32 as desired. Adjustment of the indicating dial in this manner is facilitated by the pulley system which offers little resistance because of the inherent slippage of its pulley belt.

From the foregoing it will be apparent, that the directional gyroscope of the present invention has several improved features which insure highly accurate and dependable performance suitable for use in private or commercial aircraft.

Modifications and adaptations of the present invention will be readily apparent from the foregoing description and associated drawings, although not specifically mentioned herein.

We claim:
1. A directional gyroscope comprising in combination, a frame, an outer gimbal having opposite trunnions mounted for rotation in the frame about a first axis, an inner gimbal mounted for rotation in the outer gimbal about a second axis perpendicular to the first axis, a gyroscope rotor mounted in the inner gimbal for rotation about a spinning axis perpendicular to the second axis, drive means for spinning the gyroscope rotor, indicating means for indicating directional changes in response to rotation of the outer gimbal, and pulley means for transmitting rotation of the outer gimbal to the indicating means, said pulley means including a pickoff pulley fixed with respect to one of the trunnions of the outer gimball for rotation therewith about the first axis, a drive pulley operatively connected to the indicating means to rotate the indicating means upon rotation of the drive pulley, and a pulley belt trained about said pickoff pulley and said drive pulley to rotate the drive pulley upon rotation of the outer gimbal and the pickoff pulley in response to directional changes.

2. The directional gyroscope defined in claim 1 further including guide means for guiding said pulley belt between said pickoff pulley and said drive pulley.

3. A directional gyroscope comprising in combination, a frame, an outer gimbal having opposite trunnions mounted for rotation in the frame about a first axis, an inner gimbal mounted for rotation in the outer gimbal about a second axis perpendicular to the first axis, a gyroscope rotor mounted in the inner gimbal for rotation about a spinning axis perpendicular to the second axis, drive means for spinning the gyroscope rotor, indicating means for indicating directional changes in response to rotation of the outer gimbal, and pulley means for transmitting rotation of the outer gimbal to the indicating means, said pulley means including a pickoff pulley fixed with respect to one of the trunnions of the outer gimbal for rotation therewith about the first axis, at least one idler pulley, a drive pulley, a belt trained about said pulleys to rotate the drive pulley upon rotation of the outer gimbal in response to directional changes, and a drive shaft operatively interconnecting the drive pulley with the indicating means to rotate the indicating means to indicate directional changes.

4. The gyroscope defined in claim 3 further including a second idler pulley coaxially mounted with respect to the first idler pulley for rotation, the idler pulleys receiving opposite portions of the belt extending between the pick-off and drive pulleys.

5. The directional gyroscope defined in claim 3 further including spring means for maintaining the belt taut.

6. The directional gyroscope defined in claim 5 further including an idler pulley shaft rotatably receiving said idler pulleys and wherein said spring means includes a tension coil spring having one end fixed to the frame and an opposite end fixed with respect to the idler pulley shaft.

7. The directional gyroscope defined in claim 6 wherein the idler shaft is at right angles to both the first axis and the drive shaft.

8. The directional gyroscope defined in claim 3 wherein the indicating means includes a dial and a cooperable pointer, and the drive shaft is operatively connected to one of said dial and pointer to rotate the same upon rotation of the outer gimbal in response to directional changes.

9. The directional gyroscope defined in claim 8 wherein the pointer is fixed relative to the frame and the drive shaft is drivably connected to rotate the dial.

10. A gyroscope comprising in combination, a frame, an outer gimbal mounted in the frame for rotation, an inner gimbal mounted for rotation in the outer gimbal, a gyroscope rotor supported for rotation about a spinning axis by the inner gimbal, and a pulley system for transmitting movement of the outer gimbal to the indicating means in response to changes in conditions sensed by the gyroscope, said pulley system including a pickoff pulley fixed to the outer gimbal for rotation therewith, a drive pulley operatively connected to said indicating means to move the same upon rotation of the drive pulley, and a pulley belt trained about said pickoff pulley and said drive pulley to rotate the drive pulley upon rotation of said pickoff pulley caused by rotation of the outer gimbal in response to changed conditions sensed by the gyroscope.

11. The gyroscope defined in claim 10 further including in combination, a gear adjustment means for adjusting the angular position of the indicating means, said pulley belt permitting adjustment of said indicating means by the gear means through slippage of the pulley belt relative to the pulleys during the adjustment.

12. The gyroscope defined in claim 10 wherein said indicating means is rotatable about an axis which extends at an angle to the axis of rotation of the outer gimbal and wherein there is further included a guide means positioned between the pickoff pulley and the drive pulley such that the pulley belt extends in one direction from the outer gimbal, then passes about a portion of the guide means and then extends in a second direction to said drive pulley.

13. The gyroscope defined in claim 12 wherein said guide means comprises an idler pulley.

References Cited

UNITED STATES PATENTS

| | | | |
|---|---|---|---|
| 1,856,436 | 5/1932 | Schueller | 33—204.2 |
| 1,922,861 | 8/1933 | Prendergast | 74—10.7 |
| 2,014,462 | 9/1935 | Ballard. | |
| 2,053,183 | 9/1936 | Crane et al. | 33—204.15 |
| 2,334,116 | 11/1943 | Meredith | 33—204 |
| 2,572,827 | 10/1951 | Adkins et al. | 33—204 |
| 2,785,574 | 3/1957 | Krahulec | 74—10.7 |
| 2,857,765 | 10/1958 | Kiefer | 308—189 X |
| 2,973,649 | 3/1961 | Zeigler et al. | 308—189 X |
| 3,229,532 | 1/1966 | Langley | 74—5.1 |
| 3,262,330 | 7/1966 | Cheatum | 74—227 |

WILLIAM D. MARTIN, Jr., Primary Examiner

U.S. Cl. X.R.

74—5.1, 227; 308—189